US008885630B2

(12) United States Patent
Pun et al.

(10) Patent No.: US 8,885,630 B2
(45) Date of Patent: Nov. 11, 2014

(54) TDMA COMMUNICATIONS SYSTEM WITH CONFIGURATION BEACON AND ASSOCIATED METHOD

(75) Inventors: Ngan-Cheung Pun, Fairport, NY (US); Charlie Datz, Victor, NY (US)

(73) Assignee: Harris Corporation, Melbourne, FL (US)

( * ) Notice: Subject to any disclaimer, the term of this patent is extended or adjusted under 35 U.S.C. 154(b) by 1023 days.

(21) Appl. No.: 11/762,916

(22) Filed: Jun. 14, 2007

(65) Prior Publication Data
US 2008/0310390 A1 Dec. 18, 2008

(51) Int. Cl.
*H04B 7/212* (2006.01)
*H04W 48/12* (2009.01)
*H04B 7/26* (2006.01)

(52) U.S. Cl.
CPC ............ *H04W 48/12* (2013.01); *H04B 7/2656* (2013.01)
USPC ............................ 370/347; 709/249; 370/256

(58) Field of Classification Search
USPC ................... 370/328–350; 455/412.1–414.1, 455/456.1–457; 709/220–250
See application file for complete search history.

(56) References Cited

U.S. PATENT DOCUMENTS

| | | | |
|---|---|---|---|
| 5,969,575 A | 10/1999 | Helms | 330/294 |
| 6,603,740 B1 * | 8/2003 | Du | 370/248 |
| 6,684,070 B1 | 1/2004 | Rosen et al. | 455/427 |
| 6,760,882 B1 | 7/2004 | Gesbert et al. | 714/774 |
| 6,975,600 B1 | 12/2005 | Vaughan et al. | 370/321 |
| 7,016,444 B2 | 3/2006 | Parr et al. | 375/354 |
| 7,606,178 B2 * | 10/2009 | Rahman et al. | 370/256 |
| 7,742,784 B2 | 6/2010 | Sugaya | |
| 7,894,853 B2 | 2/2011 | Sugaya | |
| 8,064,950 B2 | 11/2011 | Sugaya | |
| 2002/0078185 A1 * | 6/2002 | Swerup et al. | 709/220 |
| 2002/0098849 A1 * | 7/2002 | Bloebaum et al. | 455/456 |
| 2002/0174248 A1 * | 11/2002 | Morriss | 709/238 |
| 2003/0005162 A1 * | 1/2003 | Habetha | 709/249 |
| 2003/0176174 A1 | 9/2003 | Seppinen et al. | 455/226.1 |
| 2004/0203615 A1 * | 10/2004 | Qu et al. | 455/412.1 |

(Continued)

FOREIGN PATENT DOCUMENTS

| | | |
|---|---|---|
| JP | 2005101756 | 4/2005 |
| JP | 2005236819 | 9/2005 |

(Continued)

OTHER PUBLICATIONS

Zhou et al., "*A Timer-Based Protocol for Connected Dominating Set Construction in IEEE 802.11 Multihop Mobile Ad Hoc Networks*," Proceedings of the 2005 Symposium on Applications and the Internet, 7 pages.

(Continued)

*Primary Examiner* — Kashif Siddiqui
(74) *Attorney, Agent, or Firm* — Allen, Dyer, Doppelt, Milbrath & Gilchrist, P.A.

(57) ABSTRACT

A communications system includes a plurality of nodes forming a time division multiple access (TDMA) communications network. Each node within the TDMA communications network includes a controller and wireless communications device allowing the nodes to communicate with each other using respective timeslots in a TDMA frame, also sometimes referred to as an epoch. Each node is operative for transmitting and receiving a beacon positioned in time at the front of a frame to carry configuration information about the nodes in the TDMA communications network.

16 Claims, 4 Drawing Sheets

(56) References Cited

U.S. PATENT DOCUMENTS

| | | | |
|---|---|---|---|
| 2004/0203843 A1* | 10/2004 | Najafi | 455/456.1 |
| 2005/0085261 A1 | 4/2005 | Sugaya | |
| 2005/0201340 A1* | 9/2005 | Wang et al. | 370/337 |
| 2005/0243765 A1 | 11/2005 | Schrader et al. | |
| 2006/0116125 A1* | 6/2006 | Buckley et al. | 455/435.1 |
| 2006/0268749 A1* | 11/2006 | Rahman et al. | 370/256 |
| 2007/0010199 A1* | 1/2007 | Halfmann et al. | 455/11.1 |
| 2007/0011145 A1* | 1/2007 | Snyder | 707/3 |
| 2007/0140189 A1* | 6/2007 | Muhamed et al. | 370/338 |

FOREIGN PATENT DOCUMENTS

| | | |
|---|---|---|
| JP | 2006245906 | 9/2006 |
| JP | H11331927 | 8/2007 |
| WO | 2006068621 | 6/2006 |

OTHER PUBLICATIONS

Sheu et al., *"A Clock Synchronization Algorithm for Multi-Hop Wireless Ad Hoc Networks,"* Proceedings of the 24th International Conference on Distributed Computing Systems, 2004, 8 pages.

Sun et al., *"Location Aided Broadcast in Wireless Ad Hoc Networks,"* The Ohio State University, Department of Computer and Information Science, Columbus, Ohio, USA, 5 pages.

Ni et al., *"The Broadcast Storm Problem in a Mobile Ad Hoc Network,"* National Central University, Department of Computer Science and Information Engineering, Chung-Li, Taiwan, pp. 151-162.

Zhou et al., *"A Timer-Based Protocol for Connected Dominating Set Construction in IEEE 802.11 Multihop Mobile Ad Hoc Networks,"* Proceedings of the 2005 Symposium on Applications and the Internet, 7 pages, Feb. 2005.

Sheu et al., *"A Clock Synchronization Algorithm for Multi-Hop Wireless Ad Hoc Networks,"* Proceedings of the 24th International Conference on Distributed Computing Systems, 2004, 8 pages, Mar. 2004.

Sun et al., *"Location Aided Broadcast in Wireless Ad Hoc Networks,"* The Ohio State University, Department of Computer and Information Science, Columbus, Ohio, USA, 5 pages, Nov. 2001.

Ni et al., *"The Broadcast Storm Problem in a Mobile Ad Hoc Network,"* National Central University, Department of Computer Science and Information Engineering, Chung-Li, Taiwan, pp. 151-162, Mar. 2002.

\* cited by examiner

TDMA COMMUNICATIONS SYSTEM WITH CONFIGURATION BEACON AND ASSOCIATED METHOD

FIELD OF THE INVENTION

The present invention relates to communications systems, and more particularly, to time division multiple access (TDMA) communications systems and related methods.

BACKGROUND OF THE INVENTION

TDMA communications systems such as used in mobile ad-hoc networks (MANET's) are becoming increasingly popular. When TDMA is used with a MANET the network operates as self-configuring networks of mobile routers or associated hosts connected by wireless links to form an arbitrary topology. The routers, such as wireless mobile units, can move randomly and organize themselves arbitrarily as nodes in a network, similar to a packet radio network. The individual units require minimum configuration and their quick deployment can make ad-hoc networks suitable for emergency situations. For example, many MANET's are designed for military systems such as the JTRS (Joint Tactical Radio System) and other similar peer-to-peer or independent Basic Service Set Systems (IBSS).

A mobile ad-hoc network, with no fixed infrastructure, has also posed many challenges to the media access control (MAC) layer for multiple users. In a TDMA based ad-hoc network, it is sometimes difficult to assign non-interfering time slots to nodes and still allow spatial reuse of the bandwidth and time slots. Different nodes that are separated far enough would be able to reuse the bandwidth by using the same time slot.

A Carrier Sense Multiple Access (CSMA) based MAC design for an ad-hoc network is sometimes suitable for data transmission between mobile nodes. For example, 802.11 standards do not support voice or multimedia traffic with a desired quality of service because the transmission is contention based and asynchronous. The sharing of a radio resource often becomes unpredictable. To support voice and video streams, the system often requires bandwidth to be reserved. This could be accomplished in some TDMA based schemes by using non-interfering time slots, for example, channel scheduling.

A Code Division Multiple Access (CDMA) based system is bandwidth efficient in traditional cellular networks but it relies on adequate power control, maintained by the base station, for eliminating the near/far effect. In a mobile ad-hoc network environments, however, CDMA technology has encountered some difficulties.

The TDMA communications systems are more preferred and use a channel access system for shared radio networks. The signal is divided into different timeslots allowing users to share the same frequency channel. Users can transmit one after the other using their own timeslot within a frame (or epoch). Thus, multiple stations can share the same transmission medium or radio frequency channel and use only part of the bandwidth. A data stream in this type of system is divided into a frame (or epoch), which is divided into timeslots. Each user is allocated one timeslot, which could contain data and a guard period for synchronization.

There are issues as noted before with the network size and the media access control (MAC) configuration. The TDMA frame (epoch) and slot format are hard to configure to a fixed format while serving the purpose for networks having different sizes. In a TDMA communications system, a matching network size configuration is required to enable successful communications between users corresponding to the network nodes. In some TDMA systems, a waveform, for example, an advanced networking wideband TDMA waveform (ANW2) is used with different radios having an extended range and operating in accordance with the Software Communications Architecture (SCA).

It may be desirable to support many different network sizes, for example, a 2-node network for high capacity; a 10-node network for a high and low bandwidth mesh network; or a 48-node network for a high and low bandwidth network as non-limiting examples. Depending on the number of nodes, the epoch (frame) is divided into specific timeslots. For example, with two nodes the epoch (frame) may be divided into two timeslots. With four nodes the epoch may be divided into four timeslots and with eight nodes there are a corresponding eight timeslots. Problems can develop when one radio or other communications device attempts to enter a network and its communication with a different network configuration. For example, a node that tries to enter one network having four nodes and four timeslots, but is configured for only two nodes, would not be able to communicate with the nodes configured for a 4-node network. Current techniques to solve this problem allow the system to configure manually all nodes to the same network size, which can be time-consuming, or use some other communication system to confirm a configuration. This can be inefficient.

SUMMARY OF THE INVENTION

A communications system includes a plurality of nodes forming a time division multiple access (TDMA) communications network. Each node within the TDMA communications network includes a controller and wireless communications device allowing the nodes to communicate with each other using respective timeslots in a TDMA frame, also sometimes referred to as an epoch. Each node is operative for transmitting and receiving a beacon positioned in time at the front of a frame to carry configuration information about the nodes in the TDMA communications network.

The beacon can be formed as text message, a short message service (SMS) message or similar structure. The beacon can have a duration of about 1 ms or less as a non-limiting example. Other time periods could be used.

In other aspects, a node external to the TDMA communications network can transmit a beacon for probing the TDMA communications network for configuration information. This information could be used for a merger or to determine the configuration of the TDMA communications network. The configuration information could also be indicative of the number of nodes within the TDMA communications network or the length of a timeslot used by the nodes.

In yet another aspect, a second TDMA communications network could have a plurality of nodes. At least one node in the TDMA communications network is operative for transmitting a beacon as a probe to determine configuration information for merging TDMA communication networks. The TDMA communications network could be formed as a mobile ad-hoc network (MANET).

A method aspect is also set forth.

BRIEF DESCRIPTION OF THE DRAWING

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In accordance with a non-limiting example of the present invention, the TDMA communications system uses a small beacon at the beginning of an epoch (frame) to obtain knowledge about the network environment and permit synchronization. The use of this beacon allows the connection of different network size configurations in one waveform family. This common and short beacon for different TDMA network configurations can solve numerous problems. For example, the beacon would take a very short burst period and not waste much bandwidth, i.e., about 1 ms in a non-limiting example. It can provide a corrective measure on the network configuration or mis-configuration and provide interrupt capability for a change of network configuration or for a future change. The TDMA waveform becomes a waveform that is communicable across all different network size configurations and can be used for a future dynamic network size adaptation. It can provide an automatic confirmation on network configuration and easy deployment, and root out configuration conflicts such as may occur with unplanned group merging. It also can use a Short Message Service (SMS) for control and network planning and management instead of using voice, which may not be ready before the network is established.

In different embodiments, the beacon can be a short TDMA burst in front of the frame (or epoch), for example, an SMS message. It is possible that it could be completed to one time slot. The beacon can contain control information or control messages. It could also be applied in a generic timeslot in some non-limiting examples.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIG. 1, followed by a description of a and beacon system in accordance with a non-limiting example of the present invention.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 1:
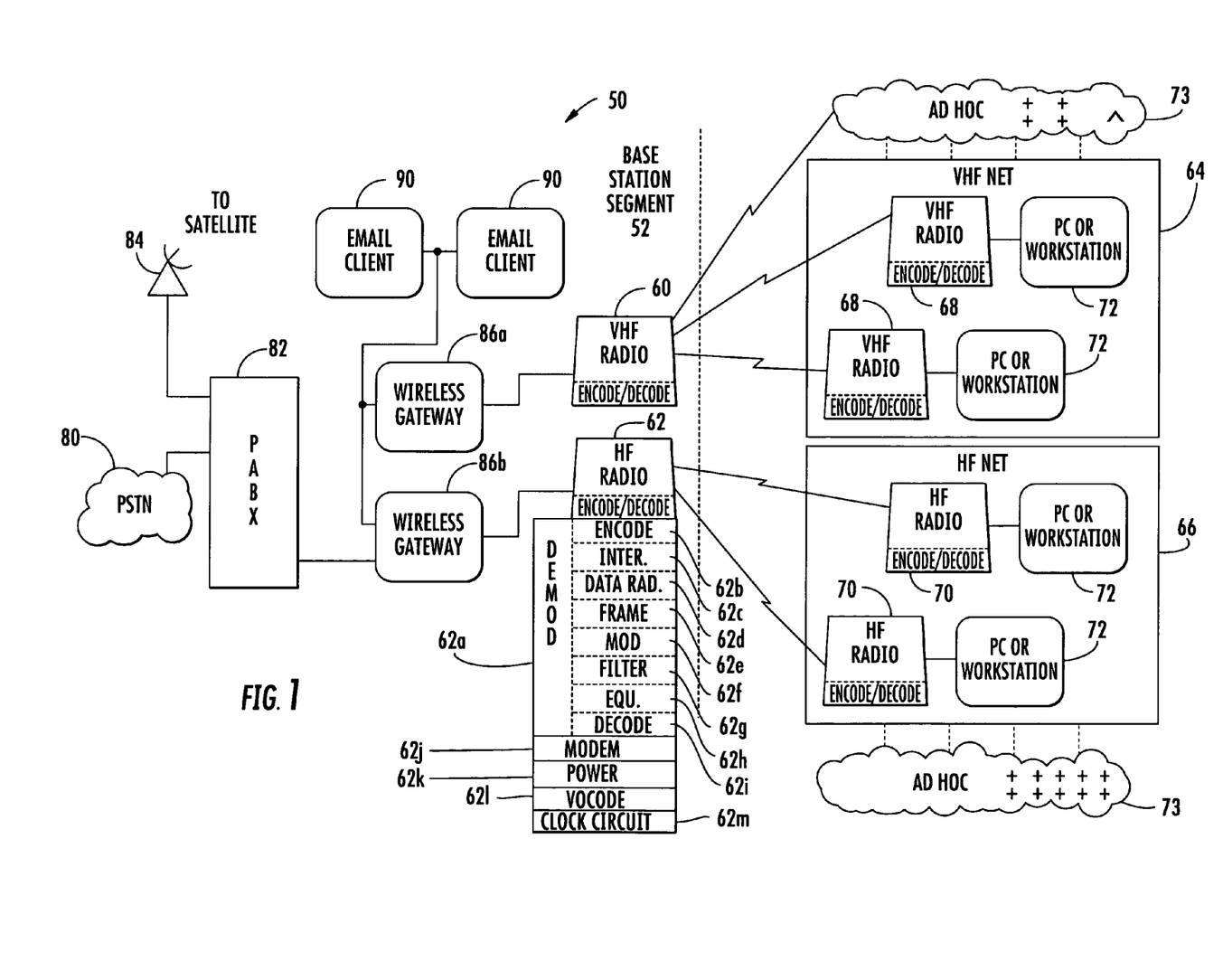
FIG. 1 is a block diagram of an example of a communications system that can be used for the present invention.

For purposes of description only, a brief description of an example of a communications system that could incorporate the TDMA beacon in accordance with a non-limiting example, is described relative to a non-limiting example shown in FIG. 1. This high-level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. Ad-hoc communication networks 73 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF radios and net segments are not illustrated, these could be included.

The radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. A vocoder circuit 62l can incorporate the decode and encode functions and a conversion unit could be a combination of the various circuits as described or a separate circuit. A clock circuit 62m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) mobile radios and transmitting and receiving stations can have similar functional circuits. Radios could range from 30 MHz to about 2 GHz as non-limiting examples.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

There now follows a general description of MANET TDMA processes as commonly used, followed by a description of the system using the TDMA beacon.

There are many different routing protocols and methods used to solve different aspects of the network issues. A background of the technology is given followed by a description of the TDMA beacon in accordance with a non-limiting example of the present invention.

A Mobile Ad-hoc Network (MANET) can be described as an autonomous system of mobile nodes. The network is typically self-organizing without the assistance from any centralized administration. Because there are no fixed and centralized base stations to maintain routes, the routing capability is typically distributed to the individual mobile nodes. Each node is usually capable of discovering routes to a destination, and each node may also act as an intermediate node, i.e., a repeater, for forwarding the data packets in a multiple hop connection. The network topology may change with time as the nodes move, enter, or leave the network. Therefore, dynamic routing capabilities and route maintenance mechanisms are usually incorporated into the nodes.

There have been many different ad-hoc network protocols, which are usually divided into two different approaches, i.e., 1) proactive, and 2) reactive. Proactive protocols, such as OLSR, CGSR, DBF, and DSDV, periodically send and exchange routing messages in the entire network to catch up with the latest changes in the topology. Reactive protocols, such as ASR, DSR, AODV, CHAMP, DYMO, and TORA, however, search for a route on-demand. A route discovery or route request message is typically flooded into the network upon request. As the request message comes to the destination node, a route reply message, carrying the whole path from the source to the destination, is transmitted back to the source node.

Some protocols combine the two approaches, but in any event, the goal of the ad-hoc routing protocol is to find the current path, defined as a sequence of intermediate nodes, from the source node to a destination node. Due to the changing topology and channel conditions, however, the routes may have changed over time. Therefore, a route entry in the routing table may not be updated when it is about to be used. The routes must be maintained either on demand or on a regular basis.

Routes can be maintained in two different levels. A first level is more concerned with the maintenance of the routing table, which is refreshed either on a regular basis or on-demand. A second level is the maintenance of an actively used route path, which may have become unstable and unusable due to the node movement, blocking by objects, terrain conditions, and other link impairments. The source node should be notified of the path errors, and another candidate route chosen or a new route discovery issued.

For table driven routing protocols, once a broken route is detected, it may take some time for the protocol to react and resolve and find a new route. Most link state based ad-hoc network protocols require a convergence of routes in the route table. For example, in Optimized Link State Routing (OLSR) protocol, a local route change would have to be broadcast to all other nodes in the network such that in the route table, the topology view is consistent. If the route table is not consistent, data packets may not be routed correctly. The data packets are forwarded from hop to hop, originating from the source node towards the destination node. Due to the node movement, some of the intermediate nodes may have already moved out of the range of each other, therefore breaking the path of delivery. Packets sometimes are dropped and the broken path condition should be detected as soon as possible to form alternative paths.

For reactive ad-hoc network protocols, the route is typically discovered on-demand. The nodes in the network keep track of the changes of the topology, but only for the part on which they send traffic. Before data is sent, the destination path is discovered by sending a route request. It takes some time for the route request to travel to the destination node, which returns the path back to the source node. Explicit route path information can be added to the packet header such that intermediate nodes can forward the packet.

A data path can also be set-up in advance. A source node transmits a path label along a newly discovered route to the destination node. The intermediate nodes remember the path label. Subsequently, the data packets having a known label are forwarded correctly. Again, if the data packet cannot be forwarded correctly along the path, the source node is notified of the path error. The source node may issue a new route discovery.

Some protocol provides local repair to a broken route. A repairing node may issue a locally bounded, limited path search downstream of the path. Due to the scope of a limited search, the response time is expected to be faster. If it is successful, then the packets may flow through the detour route. The repairing node would send a notification to the source node about the change to the path. Local repair shortens this reaction time to fixing the path failure. The mechanism, however, is not instantaneous.

A data packet can typically be forwarded from the source node to the destination node by two major methods. The forwarding decision can be made by the source node such that explicit route information is attached to the packet header. In the second method, the forwarding decision is made by intermediate nodes. If the node has a view of the network topology, the packet may be forwarded based on the routing table. If the node has a label path established for labeled packets, the forwarding decision can be based on the label of the packet. If the node has no knowledge of the network, and no established data path, the packet can be flooded to all neighbors.

In a unidirectional link, however, the sender node may not know if the receiver node actually received the packet. The sender node may have an excessive number of packets in its transmission queue. The packet to be delivered may be removed as if the packet is expired. The receiver node and the sender node may have moved apart further than the transmission range so that the packet can never by delivered via this specific link. The packets could be corrupted by signal fading or interference. ARQ (Automatic Repeat request) may be used to ensure a transmission success and a detection of a broken link. A significant delay may be incurred, however, waiting for an ACK and retransmission. Fault tolerance can be provided using multiple paths to deliver the same set of packets. More data packets can be delivered with less delay, but some trade-off is the radio resource utilization that is significantly reduced.

In ad-hoc networks, nodes are equipped with limited radio resources and data bandwidth. Data packets are typically classified according to the application requirement. Some applications require the data to be delivered in a time critical manner, while other applications require the data to be delivered in a robust manner. It is important to deliver different kinds of data packets differently and effectively according to the demands imposed by the system. For example, dropping a few voice samples is not as important as dropping a file data packet. Usually, a file data packet is less time critical, but it must be reliably delivered.

Due to the issues of data delivery and Quality of Service (QOS) requirements, packets may be duplicated in multiple communication paths so that the same packet has a higher chance of reaching its destination in time. In many multi-path routing protocols, the source node maintains a set of multiple communication paths as alternate routes in its route table. It should be understood that multi-path routes can be discovered in a similar fashion as a general route discovery.

Most of the generic route discovery mechanisms result in multiple paths without extra efforts. It is up to the source node to decide how many multi-path candidates should be maintained in the route table. When the source node is about to transmit a data packet to a destination with multi-path routes, the node may duplicate data packets, each on a separate member route of the multi-path, or the source node may use an alternative path as a backup path in case the main path is notified as broken. A higher level of fault tolerance can be achieved by sending duplicated data packets. The multiple paths can be fully disjointed or partially disjointed. A better fault tolerance can be served by the fully disjointed multiple paths. As multiple paths are used for fault tolerance, data packets are being forwarded redundantly on each member route of the multi-path. The network wide bandwidth consumption will be proportionally increased.

As set forth, there are a number of common terms used in the field. For example, a slot can be a basic TDMA time division structured by frames, also known as epochs, and slots. In each second, there are typically N number of frames, and in a frame, there are M number of time slots. Usually, each active mobile unit would have a chance, i.e., a time slot, to transmit in every frame.

A frame can be considered as a general TDMA time division unit as explained in reference to a slot.

A beacon can be a TDMA burst that is usually short and in the description it is appended in time to the front of a frame (or epoch) before the timeslots in which data from nodes is communicated. It could be completed to one slot in some instances. It could contain control information or controlled messages. In a HP-Net, however, a beacon could be transmitted in a slot. In a general TDMA scheme, it could be transmitted in a generic time slot.

A beacon slot could be the same as a slot, but also refers to the time period in front of frame containing the beacon.

In a 1-hop neighborhood, any neighboring node that is directly connected with a single link could be considered as the 1-hop neighborhood.

In a 2-hop neighborhood, any neighboring nodes that are directly connected with the maximum of 2-hops, 2 links away, could be considered as a 2-hop neighborhood.

Network density could be referred to as the number of nodes in a per 1-hop neighborhood, the number of nodes in a per 2-hop neighborhood, or the number of nodes in a per geographical area.

A node could represent a mobile unit in a network topology.

Users are typically considered nodes and sometimes are also called mobile users.

In channel access in TDMA, a channel can be defined by an exclusive use of a time slot in multiple frames. A node could be considered to have a channel when it is allowed to use a fixed time slot in all subsequent frames.

A channel collision could be a continuous slot collision in multiple frames. It usually results from more than one node trying to transmit in the same net channel, which is the same slot in the frame.

Figure 2:
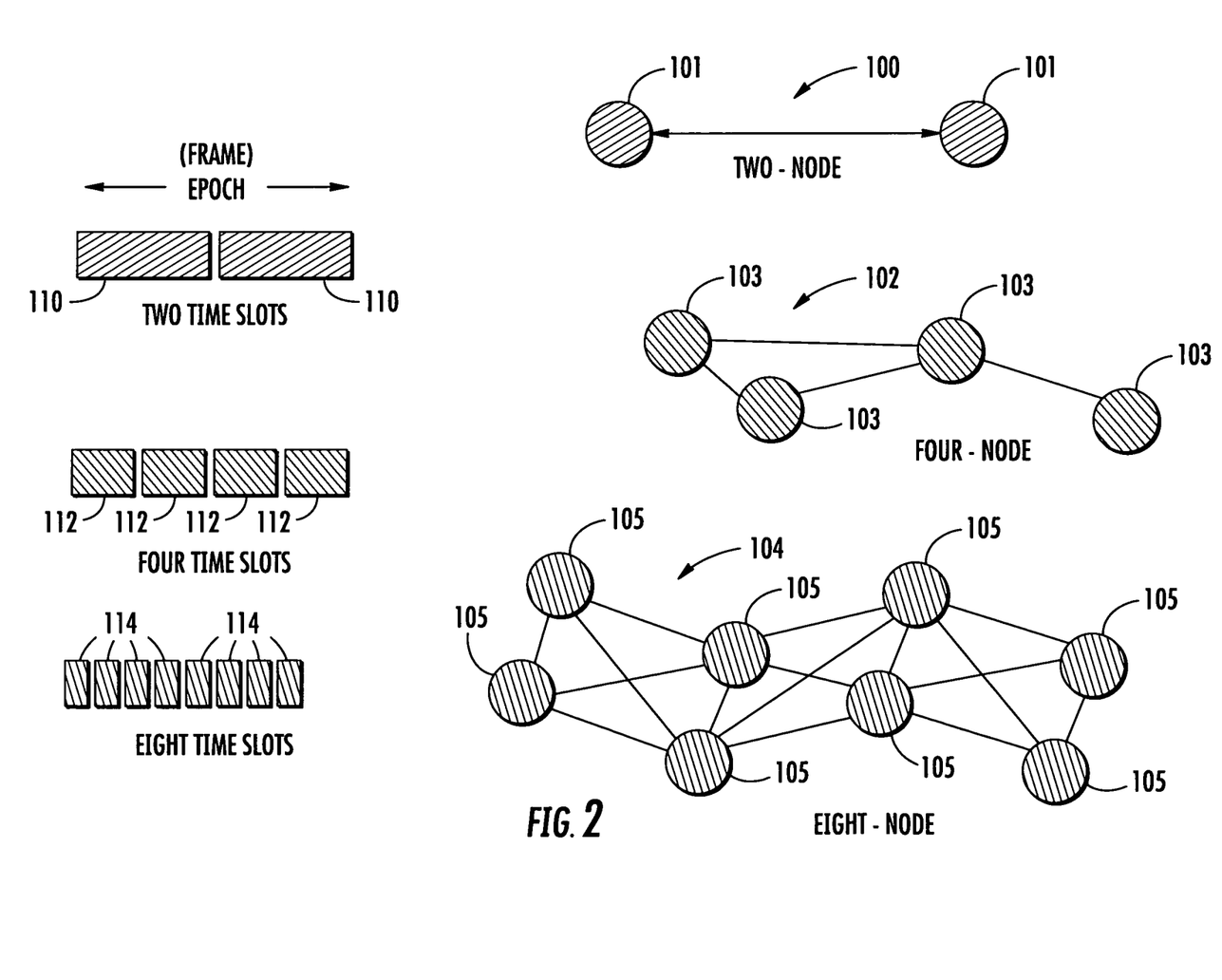
FIG. 2 is a schematic snap shot view of three different TDMA networks showing a 2-node, 4-node and 8-node network and how the epoch (or frame) is divided into the respective two, four and eight timeslots.

FIG. 2 shows a representation of a 2-node network 100, 4-node network 102 and 8-node network 104 (and respective nodes 101, 103, 105) and the representative epochs (or frames) that are subdivided into two timeslots 110 for the 2-node network 100, four timeslots 112 for the 4-node network 102 and eight timeslots 114 for the 8-node network 104. These diagrams are used to show the different length of timeslots, which depend in length on the number of nodes used in the TDMA network as illustrated. For example, a 2-node network would be used for large and high capacity communications. A larger number of nodes such as a 10-node network could be used for a small but high bandwidth mesh network. A 48-node network could be used for large and low bandwidth networks. In one example, a receiver or a mobile communications unit as a communications node could be operative for use with a 10-node network and that corresponding length of slots per epoch (or frame). If that node as a communications device attempts to enter a 2-node network or an 8-node network, the timeslots would be different in length and communication in accordance with TDMA standards could not occur since the node is configured wrong. Thus, the TDMA frame (epoch) and slot format is difficult to configure to a fixed format while serving the purpose for all sizes of networks.

Successful TDMA communications systems require a matching network size configuration. This has sometimes been solved by manually configuring all nodes to the same network size or using some other communications system to confirm a configuration.

Figure 3:
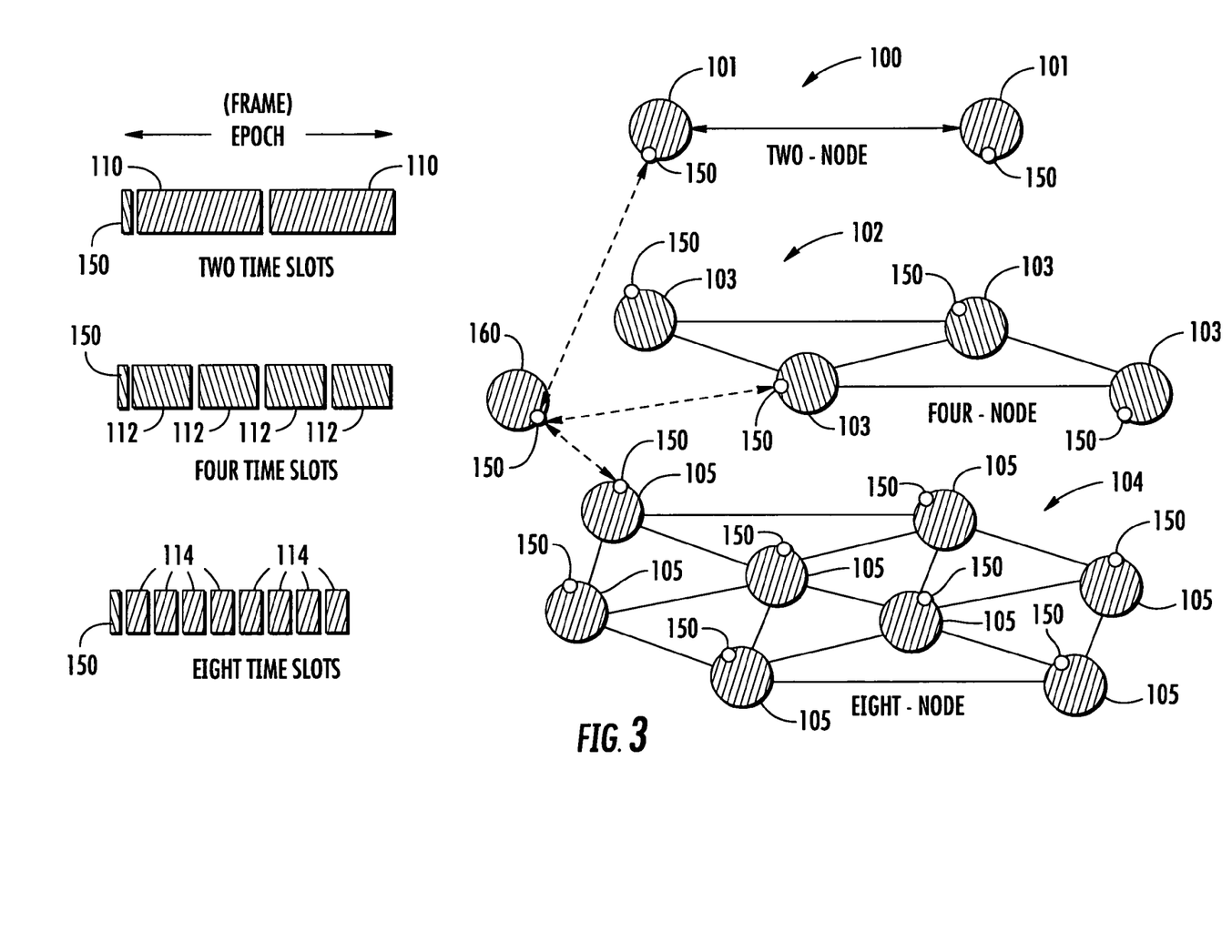
FIG. 3 is another snap shot view similar to that shown in FIG. 2, but showing the beacon placed at the beginning of the epoch (or frame) and the use of an external or foreign node that could communicate with the respective 2-node, 4-node and 8-node TDMA networks using the beacon.

In accordance with a non-limiting example of the present invention, and as illustrated in FIG. 3 a beacon 150 is placed in front of each epoch (frame), even if the epoch or frame is established for different network configurations such as a 2-node, 4-node or 8-node. As illustrated in each of the 2-node, 4-node and 8-node network configurations, each node 101, 103, 105 can transmit/receive a beacon.

The small beacon at the beginning of the epoch can be used for probing and listening, and permit a node to back-off if more nodes are used than expected. The use of the beacon is tolerant for a percentage of collisions. It also permits a node to obtain knowledge about the network environment since it acts similar to an "eye" in the network environment to determine how many nodes are located within the network and how many nodes are not configured to the same network size or do not have a slot. The use of the beacon can also permit network synchronization. A small burst corresponding to the beacon can be detected much easier by a respective node, allowing synchronization information to be obtained.

The beacon can be used to resolve network configuration mistakes and resolve unplanned merging of network groups. For example, if any nodes have a different network size configuration from other nodes or when the total network size exceeds a maximum network size configuration, the use of the beacon and information obtained from its use can resolve the mistakes and unplanned merging. It can manage network control and transmit important control or textual short messages (SM) across network groups for which there is no slot. For example, command messages for configuration or comments as to specific radio (or node) configurations could be transmitted and received. One node as a user could be a node for primary instructions or comments. For example, the beacon as a short message could recite "all radios of group id 0×ABC, please shut down now, authorized by John Smith."

The beacon should be ready for use even at the first sight of connectivity and as long as the network is synchronized.

FIG. 3 also shows a foreign node 160 that can be operative through the use of the beacon with the different networks 100, 102, 104 as it attempts to enter one of the networks. This node 160 can obtain information concerning each of the networks through the beacon transmission to the nodes in different networks and the receiving back any beacon transmissions from network nodes. For example, this foreign node 160 could be configured for a 8-node communication, operating with a specific slot length and time. Through the use of the beacon, this node can quickly determine which of the networks 100, 102, 104 is configured to operate as the 8-node network to which it can communicate. The foreign node 160, depending on radio design, could also configure itself to a selected network.

Through the use of the beacon, different network size configurations in a waveform family can be connected. The use of this common and short beacon for configuring the network is advantageous. The beacon is a short burst period and does not waste bandwidth, about 1 ms. It provides a corrective measure on network configuration or mis-configuration since information can be transmitted in the beacon and received such that the network should be configured in a specific manner. The beacon can also provide interrupt capability for a change of network configuration or for a future change. As a result, the use of the beacon allows the chosen TDMA waveform to become a waveform that is communicable across all different network size configurations and it can be used for future dynamic network size adaptation.

In the use of the selected TDMA waveform, the beacon provides a practical way to ensure an automatic confirmation of network configuration. Network nodes can transmit in the beacon information concerning network configuration, such as the number of nodes and similar information, and/or receive data and information regarding on-the-fly network changes or necessary parameters for communication. The beacon can provide an easy deployment to root out configuration conflict and unplanned group merging. The short message service (SMS) can be used for network control, network planning and network management instead of using voice, which may not be ready before the network is established. Thus, voice instructions may not be necessary.

The short message service (SMS) is a typical telecommunications protocol that could be used with the beacon for the sending of "short" (typically 160 characters or less) text messages. There could be some SMS gateways in the network. The SMS message could have information relating to web services and browsers besides the number of nodes or configuration information. The SMS message could have instructions to a selected radio or group of radios to change format such as can be accomplished with Software Defined Radios.

The beacon in accordance with a non-limiting example of the present invention allows communication across networks for any configuration instructions, since networks should be configured to the same size to have nodes communicate successfully. Thus, the beacon acts as a "thread" that can pass or "thread" through all the nodes in the different network configurations, carrying any requisite instructions or commands. Without the use of the beacon, networks have to be manually configured to the same size. If it was determined that a network configuration was wrong, the network would have to be configured in the correct manner, or there would be no way to communicate.

This use of the beacon in accordance with a non-limiting example of the present invention could be advantageous in emergency operations. For example, a network system used by a rescue squad could use emergency radios that work as an 8-node network. In this example, fire may have occurred at a building and the rescue operators in that squad may find that the 8-node configuration is not enough and they increase the network capacity to a 16-node configuration with 16 timeslots. The squad may call for backup from headquarters, which sends out more units with radios that are configured for the previous network configuration of 8 nodes, i.e., the old network configuration. The emergency operators at the burning building had changed on-the-fly to a 16-node configuration, but when the new rescuers arrive, they find that they can not communicate and should be configured to a 16-node network configuration. It is difficult for the new rescuers in this emergency to know and ask hold the current rescuers on-location are configured. The use of the beacon, however, as a short message for example, could be used to report to the newer radios and rescuers to change on-the-fly to a proper 16-node configuration after a query from a new radio.

The foreign node as shown in FIG. 3 could correspond an emergency node that comes to the network as a new rescuer. In that example, that "foreign" node may not know which configuration to use until it comes to a the rescue location and transmits and/or receives a beacon with that information. There may also be two or three different networks in use and the foreign node can send a beacon about which network to join and communicate with the three different rescue networks. Thus, the use of the beacon can be used to configure the waveforms. The use of the beacon becomes not a matter of different modulation methods or different radio technologies, but a matter for the configuration of the radio to the selected network. It is possible to "pick" through different waveforms also.

There is some tolerance in the system since the beacon is a short timeslot and all the nodes as radios or other communications devices can use the beacon. There could be two or three nodes that use the beacon at the same time. If one node or radio is in the middle among those nodes that are "beaconing" around that particular node, to that node it would appear to be a scrambled signal because of the overlap and the collision. Because the beacons are typically used to repeat information from various network nodes, such as "my configuration is this waveform ID3" or "my configuration is waveform ID2," these messages typically would repeatedly occur. If there is some collision, sometimes there is no problem because the networks will still indicate how many nodes are in the network through the waveform. Thus, some back-off from a requesting node can occur.

If there are many nodes in the network, then it is not desirable to "beacon" often because the chance of colliding is very high. A calculation or look-up table could be used to provide statistical or other information regarding how often to transmit the beacon to lower the collision rate. Thus, the relationship of mapping the beacon rate and possible collisions to the back-off could occur and there would be some network tolerance to a percentage of collisions, even though there may not be an entire reduction in collisions. It is still possible for nodes to choose randomly even though they collided. The repeating of the beacon is advantageous in this instance. It is evident that the design is tolerable even if there is some collision and it does not frustrate the purpose of the beacon.

The beacon can also be operative to resolve unplanned merging of network groups. For example, if two networks are to be merged together, but the two networks are configured wrong or differently, it may be difficult to determine why the two networks did not merge when a network merger is attempted. With the use of the beacon, however, it is possible to determine the proper size of the networks and assist in network control and network management. The use of a beacon can also occur for sending short messages, similar to a command, for example, to an entire network team of nodes that may be formed as network nodes. For example, radios can be told to "shut-down" or configure differently without having to use a voice message. Messages can be sent as beacons to synchronize again to a desired or requested network size. Conflicts can be resolved using the beacon. Automatic configuration and confirmation can occur because information with the beacon can be repeated as would typically occur.

Figure 4:
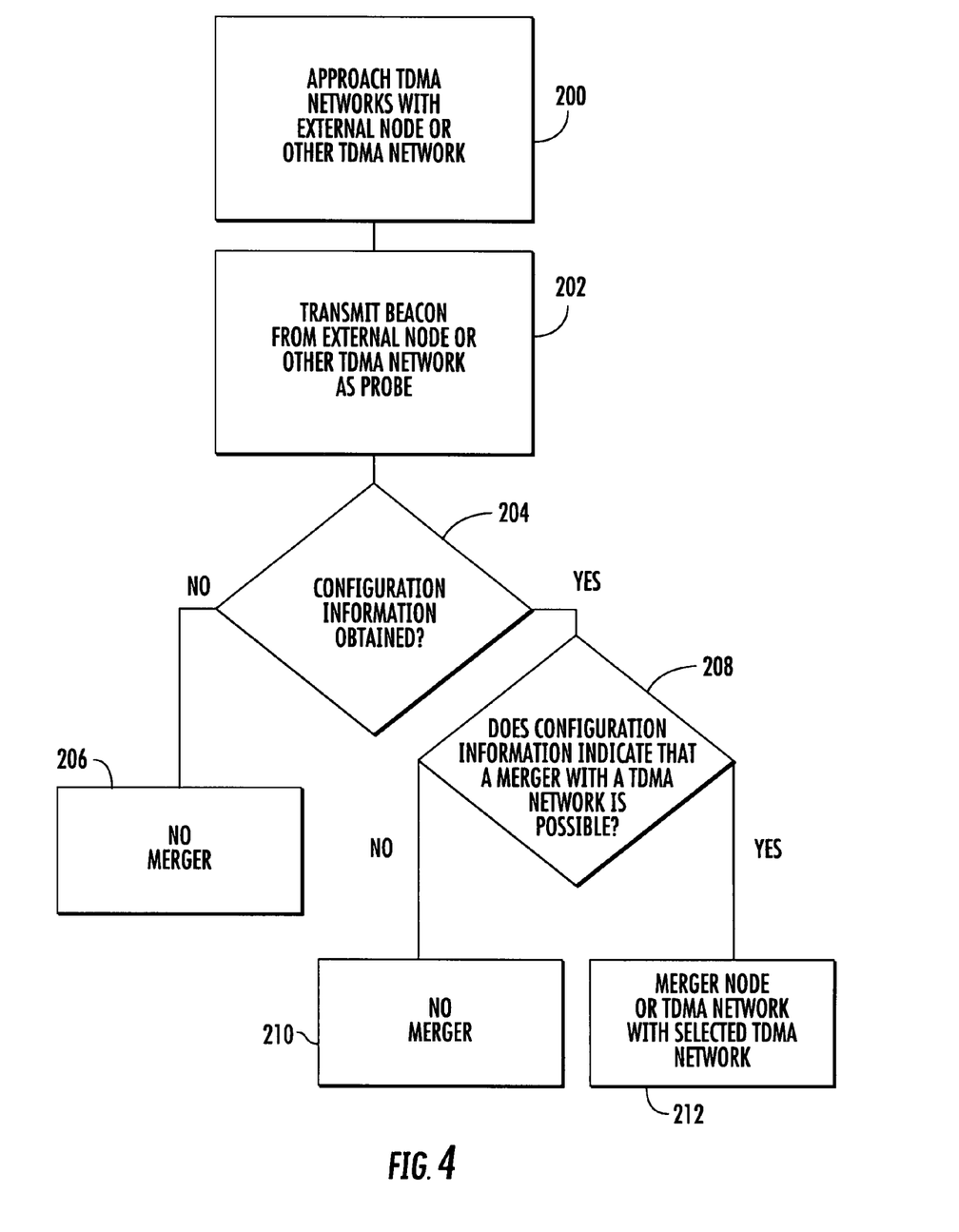
FIG. 4 is a high-level flow chart illustrating a basic method in accordance with a non-limiting example of the present invention.

FIG. 4 illustrates a high-level flow chart of the method that can be used in accordance with a non-limiting example of the present invention.

As Illustrated in the flow chart, an external node or other external TDMA network could approach one or more TDMA communications networks (Block 200). The external node or other TDMA network could transmit a beacon as a probe (Block 202). A determination is made whether configuration information has been obtained by the external node or external TDMA network (Block 204). This configuration information could be obtained by having a node in one of the networks respond back. If the answer is no, then there is no merger of the external node or TDMA network to the other network (Block 206). If the answer if yes, then a determination is made whether the configuration information indicates that a merger with a TDMA network is possible (Block 208). If merger is not possible then no merger occurs (Block 210), and if yes, then the node or TDMA network merges with the selected network (Block 212).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A communications system, comprising:
a plurality of nodes forming a Time Division Multiple Access (TDMA) communications network;
each node within the TDMA communications network comprising a controller and wireless communications device cooperating therewith to allow nodes to communicate to each other using respective time slots in a TDMA frame, wherein at least one node within the plurality of nodes transmits and receives a beacon positioned in time at the front of a frame that carries data regarding network configuration information about the nodes in the TDMA communications network, the configuration information comprising the number of nodes forming the TDMA communications network and the length of a time slot used by the nodes to communicate with each other within the TDMA communications network, and further comprising an external node external to said TDMA communications network that transmits a beacon to probe the TDMA communications network for the network configuration information from the at least one node indicative of the number of nodes forming the TDMA communications network and the length of a time slot used by the nodes to communicate with each other, wherein the external node receives data from the at least one node about the network configuration and changes its configuration to communicate in a length of time slot configured for the number of nodes forming the TDMA communications network.

2. The communications system according to claim 1, wherein said beacon comprises a text message.

3. The communications system according to claim 1, wherein said beacon comprises a short message service (SMS) message.

4. The communications system according to claim 1, wherein said beacon has a duration of about 1 ms or less.

5. The communications system according to claim 1, and further comprising a second TDMA communications network having a plurality of nodes, wherein said external node external to the first TDMA communications network is operable to transmit a beacon to probe to determine configuration information for merging TDMA communications networks.

6. The communications system according to claim 1, wherein said TDMA communications network comprises a mobile ad-hoc network (MANET).

7. A communications system, comprising:
a plurality of Time Division Multiple Access (TDMA) communications networks, each comprising a plurality of nodes;
each plurality of nodes within a TDMA communications network comprising a controller and wireless communications device cooperating therewith to allow nodes within a respective TDMA communications network to communicate with other nodes in the same TDMA communications network using respective time slots in a TDMA frame, wherein at least one node within the plurality of nodes of a first TDMA communications network transmits and receives a beacon positioned in time at the front of a frame that carries data regarding network configuration information of the respective first TDMA communications network, the configuration information comprising the number of nodes forming the first TDMA communications network and the length of time slot used by the nodes to communicate with each other within the first TDMA communications network, and further comprising an external node in one of the TDMA communications networks external to the first TDMA communications network that transmits a beacon to probe the respective first TDMA communications network for the network configuration information from the at least one node indicative of the number of nodes forming the first TDMA communications network and length of time slot used by the nodes to communicate with each other, wherein the external node receives data from the at least one node about the network configuration and changes its configuration to communicate in a length of time slot configured for the number of nodes that forms the first TDMA communications network.

8. The communications system according to claim 7, wherein said beacon comprises a text message.

9. The communications system according to claim 7, wherein said beacon comprises a short message service (SMS) message.

10. The communications system according to claim 7, wherein said beacon has a duration of about 1 ms or less.

11. The communications system according to claim 7, wherein the first TDMA communications network comprises a mobile ad-hoc network (MANET).

12. A method for communicating, comprising:
interconnecting a plurality of nodes to form a Time Division Multiple Access (TDMA) communications network, each node comprising a controller and wireless communications device that communicate within respective time slots using a TDMA frame;

transmitting or receiving within at least one node in the plurality of nodes within the TDMA communications network a beacon positioned in time at the front of a frame used to carry communication between nodes, wherein the beacon contains data regarding network configuration and synchronization information about the nodes within the TDMA communications network, the configuration information comprising the number of nodes forming the TDMA communications network and the length of time slot used by the nodes to communicate with each other within the TDMA communications network; and transmitting a beacon from an external node external to the TDMA communications network for probing the TDMA communications network for the network configuration information from the at least one node indicative of the number of nodes forming the TDMA communications network and the length of time slot used by the nodes to communicate with each other, wherein the external node receives data from the at least one node about the network configuration and changes its configuration to communicate in a length of time slot configured for the number of nodes forming the TDMA communications network.

13. The method according to claim 12, which further comprises forming the beacon as a text message.

14. The method according to claim 12, which further comprises forming the beacon as a short messaging service (SMS) message.

15. The method according to claim 12, which further comprises forming the beacon to have a duration of about 1 ms or less.

16. The method according to claim 12, which further comprises forming the TDMA communications network as mobile ad-hoc network (MANET).

* * * * *